US005835565A

United States Patent [19]
Smith et al.

[11] Patent Number: 5,835,565
[45] Date of Patent: Nov. 10, 1998

[54] TELECOMMUNICATION SYSTEM TESTER WITH INTEGRATED VOICE AND DATA

[75] Inventors: Lawrence J. Smith, Hollis, N.H.; Suzanne O. Artemieff, Harvard, Mass.

[73] Assignee: Hammer Technologies, Inc., Wilmington, Mass.

[21] Appl. No.: 808,820

[22] Filed: Feb. 28, 1997

[51] Int. Cl.$^6$ .................................................. H04M 1/24
[52] U.S. Cl. ................................... 379/5; 379/6; 379/22; 379/28; 379/93.28; 375/224
[58] Field of Search .................................. 379/1, 5, 6, 22, 379/24, 26–30, 93.01, 93.14, 93.26, 93.28; 370/241, 242, 244, 248, 249, 250, 251; 375/222, 224

[56] References Cited

U.S. PATENT DOCUMENTS

| | | | |
|---|---|---|---|
| 5,553,059 | 9/1996 | Emerson et al. | 379/28 |
| 5,572,570 | 11/1996 | Kuenzig | 379/1 |
| 5,663,909 | 9/1997 | Fitch | 379/6 |

OTHER PUBLICATIONS

*Buy Decent Tools and Test, Test*, Computer Telephony Magazine, Oct. 1996.
*Testing Dynamics*, Computer Telephony Magazine, Dec. 1995.
*Hammer Application Note*, Transaction Environments, Inc., 1992.
*Hammer Application Testing System*, Transaction Environments, Inc., 1992.
*Hammer Application Testing System*, Transaction Environments, Inc., 1993.
*Cutover Device—SSP Cutover Test Device*, Tekelec TA, 17 Oct. 1990.
*Remote Operation—Remote Operation for the MGTS Base System*, Tekelec TA, 17 Oct. 1990.
*Digital Tone/Matrix Subsystem—Tone Analyzer/Generator and Matrix Switch for the MGTS*, Tekelec, Aug. 1991.
*Message Buffer Subsystem—Memory Expansion for the MGTS/MATE*, Tekelec TA, 16 Aug. 1990.
*Message Generator Traffic Simulator—MGTS Base System*, Tekelec, Sep. 1992.
*Data Network Diagnostics*, Tekelec.
*Intelligent Network Diagnostics*, Tekelec.
*The Spectra System*, Inet Inc., 25 Feb. 1997.
*The Spinet System*, Inet Inc., 23 Feb. 1997.
*I–Net Turbo–7—16–Link System, The most powerful SS7 Tester on the market*, Inet Inc.
*The DCT–S™ Test System*, Catapult Communications Corp.
*Catapult Communications—Update No. 2*, Catapult Communications Corp.
*Catapult Communications—Update No. 8*, Catapult Communications Corp.

*Primary Examiner*—Paul Loomis
*Attorney, Agent, or Firm*—Richard E. Gamache

[57] ABSTRACT

An apparatus and method for testing a telecommunication system, which runs telephony applications such as voice-mail, telephone banking systems, automated directory assistance, and multi-branched telephone customer service systems. The apparatus includes a test computer for scheduling and controlling the execution of test scripts, which include commands for generating network signaling, voice data, and digital data used to simulate transactions that typically take place on the telecommunication system; a database for storing the test scripts, test script input data, and test results; channels for running multiple test scripts in parallel; and, serial and voice ports for transmitting and receiving voice data and digital data to and from the telecommunication system.

15 Claims, 2 Drawing Sheets

TELECOMMUNICATION SYSTEM TESTER WITH INTEGRATED VOICE AND DATA

This invention relates generally to telecommunication system testers, and more particularly to telecommunication system testers that process both voice and digital data.

Telecommunication networks, such as conventional public or private switched telephone networks and more recently packet-switched networks and the Internet, interconnect human operators and telecommunication systems, which commonly run telephony applications including voice-mail, telephone banking systems, automated directory assistance, and multi-branched telephone customer service systems. Because such telecommunication systems must operate with a high degree of reliability, they are generally tested during both the manufacturing and development processes, and while the telecommunication systems are in-service.

Telecommunication systems that run telephony applications are usually tested with applications tests, which typically include various input and output sequences that duplicate transactions normally applied to each telecommunication system. For example, during normal operation, either human operators or computerized telephony devices might send dual-tone multi-frequency (DTMF) or multi-frequency (MF) signals that represent "going off-hook" or "hanging-up a telephone" to the telecommunication system. Further, the input and output sequences are generally incorporated in test scripts, which typically include a series of commands for each transaction such as SEND_DTMF, OFF_HOOK, and ON_HOOK.

One method of testing telecommunication systems that run telephony applications uses a HAMMER™ testing system, which is sold by Hammer Technologies, Inc., of Wilmington, Mass. The HAMMER™ testing system sends both voice and non-voice signals over a telecommunication network for controlling and testing a telecommunication system under test. Further, the HAMMER™ testing system includes voice recognition capability for evaluating voice response signals produced by the system under test. Also, a human operator using the HAMMER™ testing system can interactively transmit test signals and detect response signals while automatically recording both the transmitted test signals and the detected response signals, thereby simplifying the preparation of test scripts for automatically testing the system under test.

Although the HAMMER™ testing system has been successfully used for testing various telecommunication systems, we have recognized that some telecommunication systems cannot be fully tested by just sending voice and non-voice signals and detecting response signals over a telecommunication network. In particular, some telecommunication systems incorporate databases that are accessed via digital data lines.

For example, a telecommunication system might run a telephony application that allows a telephone call to be transferred from the telecommunication system to a human operator, who can then request a set of data related to the telephone call from a file server for subsequent display on a computer screen. This is commonly known as a "screen pop." Also, local user switches that connect to switched telephone networks generally incorporate digital data lines for transmitting call history logs.

However, no telecommunication system testers currently available can completely test such telecommunication systems. In particular, no telecommunication system testers currently available can test digital data lines used to produce the screen pop or the call history logs.

Accordingly, it would be desirable to have a telecommunication system tester that can process both voice and digital data. It would also be desirable to have a telecommunication system tester that can easily switch between voice and digital data on different lines, thereby simulating transactions that normally take place on telecommunication systems running telephony applications.

SUMMARY OF THE INVENTION

With the foregoing background in mind, it is an object of the invention to test and monitor a telecommunication system that runs telephony applications and is connectable to a telecommunication network.

Another object of the invention is to coordinate the processing of both voice and digital data on a plurality of lines connected to the telecommunication system running telephony applications.

The foregoing and other objects are achieved by providing a method for testing a telecommunication system running a telephony application including generating in a telecommunication system tester test data including both voice and digital data for determining a current status of a system under test and for simulating normal user transactions with the system under test; accessing a database in the telecommunication system tester while generating the voice and digital data; transmitting the voice and digital data to the system under test; simultaneously detecting both voice and digital data produced in response to the test data by the system under test on a plurality of lines; and evaluating the detected voice and digital data for determining if the system under test is operating properly.

In one embodiment, a plurality of initial test data are generated and transmitted to the system under test for acquiring the current status of the system under test. Next, a plurality of subsequent test data are generated using the acquired current status of the system under test. The subsequent test data are then transmitted to the system under test, and a plurality of response data including voice and digital data are produced by the system under test in response to the subsequent test data. The response data are then compared with expected response data for determining whether or not the system under test is operating properly.

In another embodiment, a plurality of voice test data are generated and transmitted to the system under test. Next, a plurality of response data are produced by the system under test in response to the voice test data. The response data are then compared with expected response data for determining whether or not the system under test is operating properly.

In still another embodiment, a plurality of test data including voice and digital data are generated and transmitted to the system under test. A plurality of response data including both voice and digital data are received from the system under test, wherein the voice and digital data are received on respective lines. While the test data are transmitted and response data are received, a database is accessed and the response data are compared with expected response data for determining whether or not the system under test is operating properly.

Still further objects and advantages will become apparent from a consideration of the ensuing description and drawings.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
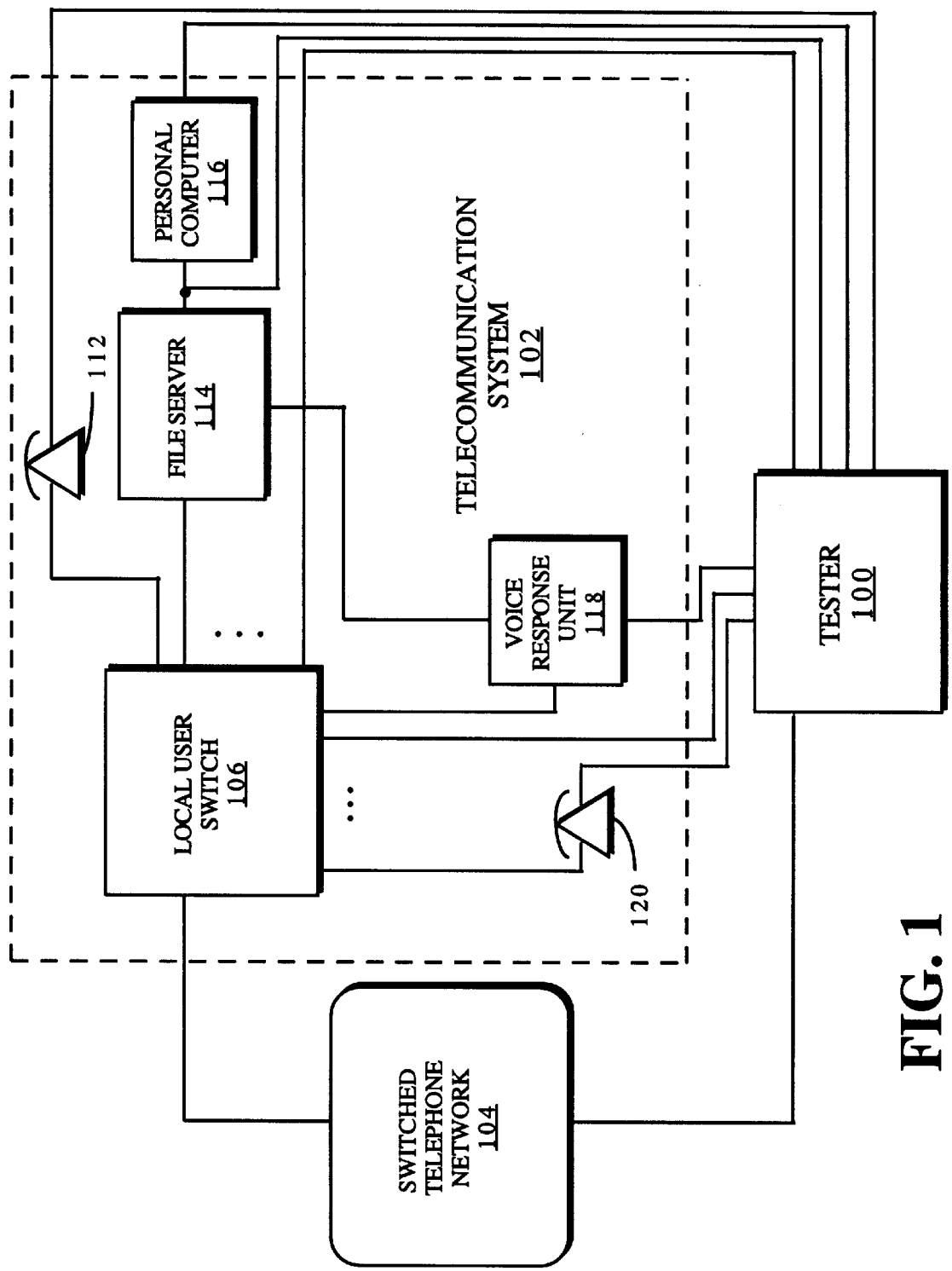
FIG. 1 is an example of the telecommunication system tester connected to a telecommunication network and a telecommunication system in accordance with the present invention.

FIG. 1 shows telecommunication system tester 100 connected to both switched telephone network 104 and telecommunication system 102 in a typical test configuration. Switched telephone network 104 might be either a public or a private switch telephone network. Also, telecommunication system 102 includes local user switch 106, digital telephone 112, file server 114, personal computer 116, voice response unit 118, and conventional analog telephone 120.

Local user switch 106 supports both digital and analog customer premises equipment. Further, telecommunication system 102 may be a voice-mail system, a telephone banking system, an automated directory assistance system, or other similar system that runs telephony applications for processing both voice and digital data.

In a typical mode of operation, tester 100 tests telecommunication system 102 by first transmitting test data including both voice and digital data to telecommunication system 102, and then by detecting and evaluating response data including voice and digital data produced by telecommunication system 102.

In the preferred embodiment, tester 100 simulates network signaling, and voice and digital test data that might be applied to telecommunication system 102 by a human operator dialing into telecommunication system 102, or by another computer attached to telecommunication system 102. Tester 100 then preferably and simultaneously detects both voice and digital response data, and evaluates the response data for determining if telecommunication system 102 is operating properly.

Tester 100 also preferably uses telephony applications tests for verifying the operation of telecommunication system 102. Each applications test typically includes at least one sequence of commands for controlling both tester 100 and telecommunication system 102, such as SEND_DTMF, SEND_MF, ON_HOOK, OFF_HOOK, DIAL_N1, and PUSHBUTTON_B1. Each sequence of commands is generally known as a transaction, and a group of transactions is generally known as a test script.

Test scripts are typically written in a high-level computer language. In the preferred embodiment, test scripts are written in an object-oriented programming language, such as the object-oriented programming language sold by Microsoft Corporation under the trademark, "VISUAL BASIC." This is primarily because today's telecommunication systems are commonly designed to operate in a client/server environment, and object-oriented languages such as Visual Basic are particularly suited to the client/server environment.

In the preferred embodiment, test scripts are written in an object-oriented programming language that is compatible with the Visual Basic programming language and also supports extensions for facilitating telephony and telecommunication system testing. Also, the human operator of tester 100 might prepare the test scripts before testing telecommunication system 102, or the human operator might automatically generate the test scripts by operating tester 100 in an interactive mode, which is described in U.S. Pat. No. 5,572,570, issued Nov. 5, 1996, assigned to the same assignee as the present invention, the disclosure of which is expressly incorporated herein by reference.

Figure 2:
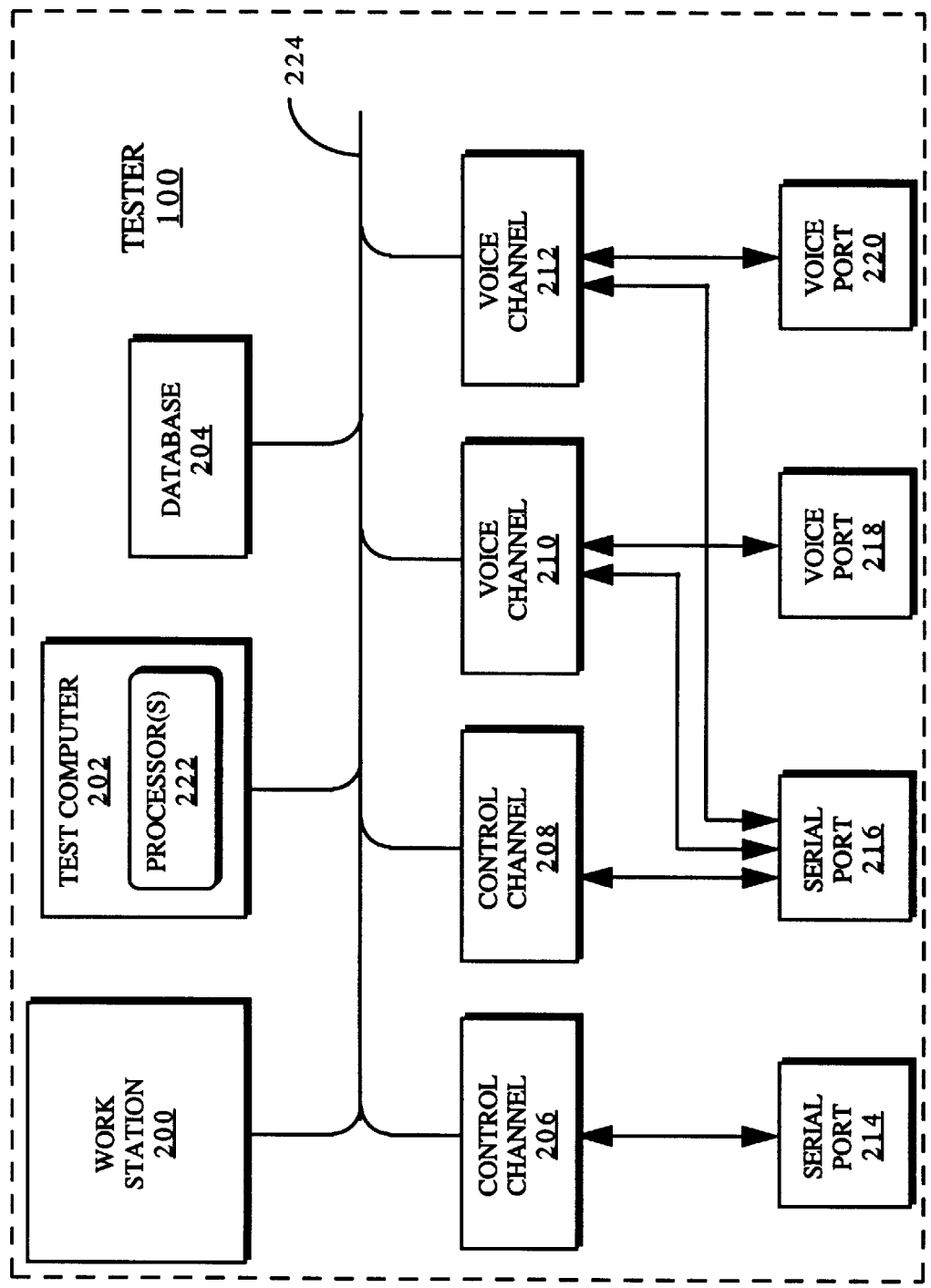
FIG. 2 is a partial block diagram of the telecommunication system tester in accordance with the present invention.

Turning to FIG. 2, primary components of tester 100 for coordinating the processing of both voice and digital data on multiple lines are shown. In particular, tester 100 includes a plurality of channels, each channel being a vehicle for running a specific test script.

Test scripts are typically scheduled for running on one or more of the channels. Further, a set of one or more related test scripts are typically combined in what is generally known as a test suite, which includes identities of the channels upon which each related test script is to be run and might also include other test suites. Tester 100 may run only one test suite during the test session, or may preferably run multiple test suites simultaneously as long as the test suites do not require a specific channel at the same time.

There are generally two types of channels in tester 100; for example, control channels 206 and 208, and voice channels 210 and 212. Each channel can access a serial port on a data communications board, such as the data communications boards sold by Digi Corporation. The data communication board typically provides an EIA RS-232C standard serial interface. In particular, control channel 206 is shown coupled to serial port 214, and control channel 208, voice channel 210, and voice channel 212 are shown coupled to serial port 216. This is because the serial ports in tester 100 can be either dedicated to a specific channel or shared by multiple channels.

Whereas both types of channels can access the serial ports, only voice channels 210 and 212 can access voice ports 218 and 220, which generally correspond to input/output ports on a telephony board such as the telephony boards sold by Natural Microsystems Corporation. In particular, voice channel 210 is coupled to voice port 218, and voice channel 212 is coupled to voice port 220. In the preferred embodiment, tester 100 includes at least ninety-six (96) ports.

Tester 100 also includes work station 200, test computer 202, and database 204, which are connected to control channels 206 and 208 and voice channels 210 and 212 via bus 224.

Test computer 202 incorporates processors 222, which schedule and control the execution of test scripts running on channels 206, 208, 210, and 212. Processors 222 preferably operate under the control of an operating system that permits the creation and execution of multiple "threads of control," such as the operating system sold by Microsoft Corporation under the trademark, "WINDOWS NT."

It is known that the creation of threads of control is independent of the number of available processors in a tester. For example, if there are enough processors available, then all threads of control can be executed in parallel. Alternatively, if there are more threads of control than available processors, then some threads of control will queue up and wait until a processor becomes available.

In the preferred embodiment, processors 222 schedule and control the execution of test scripts for transmitting voice and digital data, detecting voice and digital data, and evaluating voice and digital data. Further, each test script is preferably run on a specific channel and assigned to a specific thread of control. As a result, the test scripts can be executed in parallel, as long as the number of threads of control equals the number of available processors.

Database 204 is generally a non-volatile memory for storing test scripts and test script input data, and for logging test results. Further, database 204 preferably uses tables for defining a structure of one or more data records, which typically consist of a plurality of items of information known as fields. Each table generally indicates the total number of fields, the field type, and the field size. Finally, each record generally includes a set of values for each field.

The ability to simulate transactions that normally take place on telecommunication systems running telephony applications constitutes a substantial advantage of tester 100. Accordingly, tester 100 has features that facilitate the coordination of both voice and digital data carried over a single line and preferably a plurality of lines.

One such feature is incorporated in input and export variables, which are extensions to the object-oriented programming language used to write the test scripts. For example, input variables can be used for inputting values into a test script in which they are declared, either before the test script is run or while the test script is running. Further, export variables can be used in a test script running on one channel for sending values to another test script running on a different channel. Also, tester 100 can display corresponding values for both the input and export variables on a monitor included in work station 200 while the test scripts are running.

In addition to the input and export variables, tester 100 supports commands for allowing inter-channel communication. For example, control channel 206 might wait for a request from voice channel 210, which could be generating calls. After receiving the request, control channel 206 might retrieve a record of data from database 204 for a next call to be generated by voice channel 210. Control channel 206 preferably passes the record of data by copying each succeeding field in the record into consecutive elements of a variant array, and then passing the variant array to voice channel 210.

As another example, a conference call feature of local user switch 106 might be tested by passing specific DTMF or MF sequences between voice channel 210 and voice channel 212, which could be participating in the conference call, thereby ensuring that local user switch 106 connected voice channels 210 and 212 together correctly.

As mentioned above, tester 100 is useful for simulating transactions that typically take place on telecommunication systems that run telephony applications. Accordingly, tester 100 also has features that enable it to perform a wide variety of both telephony and data communication functions.

In particular, tester 100 includes features that allow it to communicate with telecommunication networks operating under different network protocols. For example, before accessing either voice port 218 or 220, test scripts running on either voice channel 210 or 212 preferably execute a command that specifies a network protocol for voice port 218 or 220. The specified network protocol may typically be a loop-start protocol, a wink-start protocol, or a MFC-R2, each of which are known to those skilled in this art. After the network protocol is specified for either voice port 218 or 220, test scripts running on either voice channel 210 or 212 can then execute commands for other telephony functions while network signaling for the specified network protocol is generated automatically in the background.

An exception to the preferred embodiment occurs when the human operator of tester 100 wishes to handle network signaling within a test script. In this case, the test script running on either voice channel 210 or 212 would typically execute a command that specifies a "no call control" (NOCC) protocol for voice port 218 or 220. The test script would then perform other telephony functions along with any required network signaling.

For example, most commands executed by tester 100 return what is commonly known as an event, which is the lowest-level action or response that can be recognized by either tester 100 or telecommunication system 102. Events generally contain the following information: a type, for example, CALL_CONNECTED or CALL_DISCONNECTED; a time stamp; and a status value. Also, events may be either informational, which do not require any subsequent action by tester 100 or telecommunication system 102, or transitional, which require either a subsequent action or acknowledgment by tester 100 or telecommunication system 102.

When a network protocol other than NOCC is specified for voice ports 218 and 220, test scripts running on either voice channel 210 or 212 can perform telephony functions synchronously, which means that a single event is returned to the test scripts after each function is completed. Although commands included in each telephony function might have returned numerous intervening events, only a final event generally indicating successful or unsuccessful completion of each function is returned.

In contrast, when the NOCC protocol is specified for voice ports 218 and 220, test scripts running on either voice port 218 or 220 can perform telephony functions asynchronously. This means that each test script can capture the intervening events, thereby giving the human operator greater control over a given test.

The telephony functions that can be performed by test scripts running on either voice channel 210 or 212 include call control functions, voice play and record functions, speech recognition functions, and digit and tone generation and detection functions.

The call control functions, which are generally used in test scripts for establishing telephonic connections between tester 100 and telecommunication system 102, generally perform the following tasks: answer an incoming call, return a specified event for a current call, retrieve a current call control status, place an outbound call, place a first call on "hold" and place a second outbound call, reject an incoming call, release a call, release a second call and retrieve a first call, transfer a call, and wait for an incoming call.

Tester 100 establishes the telephonic connections by either receiving incoming calls or placing outbound calls. For example, tester 100 may receive an inbound call on either voice channel 210 or 212 by first performing the call control function that instructs either voice channel 210 or 212 to wait for an incoming call. When switched telephone network 104 offers an incoming call, the call control function returns an event having type, INCOMING_CALL, which causes either voice channel 210 or 212 to change from an "idle" state to an "incoming call" state. If the loop-start network protocol is used, then switched telephone network 104 would typically offer the incoming call by sending DTMF or MF signals representing a series of rings. Further, if the wink-start network protocol is used, then switched telephone network 104 would typically offer the incoming call by sending signals representing an off-hook condition.

Tester 100 then decides whether to accept or reject the incoming call. If tester 100 waits too long before making a decision, then the incoming call is automatically rejected and the call control function returns an event having type, REJECTING_CALL.

Alternatively, if tester 100 decides to answer the incoming call, then tester 100 performs the call control function that answers an incoming call. The call control function also returns an ANSWERING_CALL event, which causes either voice port 218 or 220 to change from the "incoming call" state to an "answering call" state. When the telephonic connection is made, the CALL_CONNECTED event is returned, which causes either voice port 218 or 220 to change from the "answering call" state to a "connected" state.

Further, if tester 100 decides to reject the incoming call, then tester 100 performs the call control function that rejects an incoming call. The call control function also returns a REJECTING_CALL event. Also, if the incoming call becomes disconnected for any reason, then the CALL_DISCONNECTED event is returned. The status value for the CALL_DISCONNECTED event preferably contains information about why the call was disconnected.

Finally, when tester 100 decides to end the incoming call, it performs the call control function that releases a call. The call control function also returns a CALL_RELEASED event, which causes either voice port 218 or 220 to change from the "connected" state back to the "idle" state.

Similarly, tester 100 may place an outbound call using either voice channel 210 or 212. Accordingly, the following steps are preferably performed: the "place an outbound call" call function is invoked; a PLACING_CALL event is returned; a destination address is delivered to switched telephone network 104 by tester 100; a CALL_PROCEEDING event is returned; a ring tone or an off-hook condition is received by tester 100 from switched telephone network 104; a REMOTE_ALERTING event is returned; a REMOTE_ANSWERED event is returned when signaling received by a serial port indicates a connection, or when voice data is detected; a CALL_CONNECTED event is returned when a telephonic connection is made; a CALL_DISCONNECTED event is return when the telephonic connection becomes disconnected for any reason; and a CALL_RELEASED event is returned when tester 100 decides to end the outbound call.

In the preferred embodiment, a "connect-mask" is used in test scripts for indicating which event causes either voice port 218 or 220 to proceed from either the "incoming call" state or a "placing call" state to the "connected" state. Similarly, a "disconnect-mask" is used in test scripts for indicating which event causes either voice port 218 or 220 to proceed from either the "incoming call" state or the "placing call" state to the "disconnected" state.

As is known to those skilled in this art, a "mask" is a logical function for setting certain bits in a pre-defined field of bits to established binary states. Accordingly, either voice port 218 or 220 will enter the "connected" state if a bit in the connect-mask, which corresponds to one of the following general events, is set: a ring tone stops and no events are detected; signaling on a serial port indicates a network connection; voice data is detected; or a dial tone is detected after placing a call. Further, connect-mask preferably has a bit which, if set, unconditionally causes either voice port 218 or 220 to enter the "connected" state immediately after placing the call.

Similarly, either voice port 218 or 220 will enter the "disconnected" state if a bit in the disconnect-mask, which corresponds to one of the following general events, is set: a ring tone stops and no events are detected; voice data is detected; or no events are detected after the CALL_PROCEEDING event is returned.

Another feature of tester 100 is that the decision concerning whether to proceed to either the "connected" or "disconnected" state can be conditioned upon a duration of the detected voice data. Accordingly, both the connect-mask and the disconnect-mask include bits that correspond to the following additional general events: voice data lasts longer than a "medium" time threshold; voice data lasts longer than a "long" time threshold; and, voice data lasts longer than an "extended" time threshold.

In particular, a test script might set the bit in the connect-mask that corresponds to the long time threshold. As a result, either voice port 218 or 220 would proceed to the "connected" state after detecting voice data having a relatively long duration; for example, "Welcome to your bank. Please enter your account number, now." However, if the detected voice data had a relatively short duration such as the single word "Hello," then either voice port 218 or 220 would not proceed to the "connected" state.

The voice play and record functions, which are used in test scripts for sending voice data from tester 100 to telecommunication system 102 and for recording voice data received from telecommunication system 102, generally perform the following tasks: play a voice data file, play a set of voice data files, record a voice data file, and record a set of voice data files.

The speech recognition functions, which are used in test scripts for receiving voice data from telecommunication system 102 and for recognizing the received voice data, generally perform the following tasks: load a vocabulary, begin speech recognition, save a phrase included in the received voice data (commonly known as a speech clip), and get the speech clips in the vocabulary that "match" the saved speech clip.

The digit and tone generation and detection functions generally perform the following tasks: collect DTMF or MF signals, generate DTMF or MF signals, generate tone signals, detect tone signals, detect energy, and detect silence. The voice play and record functions, the speech recognition functions, and the digit and tone generation and detection functions, are generally described in U.S. Pat. No. 5,572,570 mentioned above.

Tester 100 also includes a feature for importing previously recorded speech clips. Not only can tester 100 create a vocabulary by collecting speech clips from telecommunication system 102 under control of a test script or in the interactive mode, but it can also create the vocabulary by loading a previously recorded speech clip and then building the vocabulary.

The data communication functions that can be performed by test scripts include port configuring functions, port reserving functions, data sending functions, and data receiving functions. Further, the data communication functions are generally used in test scripts for passing digital data between tester 100 and telecommunication system 102.

Tester 100 passes digital data by either sending data to telecommunication system 102 or receiving data from telecommunication system 102. In particular, tester 100 may send digital data using either control channel 206, control channel 208, voice channel 210 or voice channel 212 by first performing the port configuring function that sets the port configuration. For example, commands within the port configuring function may set a baud rate, a parity, a number of data bits, a number of stop bits, and a flow control for either serial port 214 or 216. Further, flow control protocols include XON/XOFF and CTS/DTR.

If either serial port 214 or 216 is dedicated to a specific channel, then tester 100 preferably performs the port reserving function that reserves either serial port 214 or 216 for sending and/or receiving data. This is because digital data sent to a serial port that has not been reserved for receiving data is generally discarded. When either serial port 214 or 216 is no longer needed for sending and/or receiving, tester 100 performs the port reserving function that releases the port.

Tester 100 may then send digital data to telecommunication system 102 by performing the data sending functions, which include both a synchronous data sending function and an asynchronous data sending function. For example, the synchronous data sending function returns an event only when either serial port 214 or 216 has finished sending digital data or when the synchronous data sending function has "timed-out." In contrast, the asynchronous data sending function returns an event immediately, whether or not the function has finished sending the digital data. In the preferred embodiment, the asynchronous data sending function places the digital data in a buffer (not shown) if it must wait before sending the digital data.

Alternatively, tester 100 may then receive data from telecommunication system 102 by performing the data receiving functions, which preferably places digital data received by either serial port 214 or 216 in another buffer (not shown).

Certain events returned by the data communication functions also facilitate the coordination of both voice and digital data carried between tester 100 and telecommunication system 102. In particular, if pre-defined periods of time pass before the data sending functions and the data receiving functions complete, then the functions return an event having type, COMM_TIMEOUT. Also, if an error occurs during the performance of the data sending functions and the data receiving functions, then the functions return another event having type, COMM_ERROR. Both of these events are informational. For example, the COMM_ERROR event can be queried for obtaining detailed information about the error.

The above mentioned advantages of tester 100 are realized when testing telecommunication system 102, which incorporates both computer and communication technologies, in accordance with the following illustrative procedure.

First, status data is received, which defines a current status of telecommunication system 102. In particular, tester 100 may query telecommunication system 102 using either serial port 214 or 216. Accordingly, tester 100 might query telecommunication system 102 for determining which subsystems are present and whether the subsystems are responsive. For example, telecommunication system 102 includes the following subsystems: local user switch 106, digital telephone 112, file server 114, personal computer 116, voice response unit 118, and analog telephone 120. Further, tester 100 might query local user switch 106 for determining a current load status.

Next, test data is generated using the received status data. The generated test data preferably includes both voice and digital data. In particular, tester 100 may tailor the test data according to the current status of telecommunication system 102. For example, tester 100 might abort a test if at least one of the subsystems is unresponsive. Also, the test data would usually be generated so that it is suitable for testing telecommunication system 102 having local user switch 106, digital telephone 112, file server 114, personal computer 116, voice response unit 118, and analog telephone 120. Further, the number of outbound calls placed by tester 100 might depend upon the current load status of telecommunication system 102.

The test data is then transmitted to telecommunication system 102, and response data is received from telecommunication system 102. The received response data preferably includes both voice and digital data. Also, the response data is preferably received while the test data is being transmitted, thereby simulating transactions that normally take place on telecommunication system 102.

Finally, the response data is compared with expected response data, which may be stored in database 204. In the preferred embodiment, the response data is compared with the expected response data while the test data is generated and response data is received. A primary feature of tester 100 is that it can be used for processing both voice and digital data while accessing database 204. This feature makes tester 100 useful for testing many telephony applications.

For, example, tester 100 may transmit test data for obtaining all or a portion of the voice and digital response data that telecommunication system 102 is capable of producing. In particular, tester 100 might test a telephony application by going back through each level in a logic tree of the telephony application. Such tests are generally known as regression tests, and they usually require complex test suites running on a plurality of channels.

Also, tester 100 may transmit test data for verifying a specific feature of telecommunication system 102. In particular, tester 100 might test the telephony application by focusing on the specific feature. These tests are generally known as feature tests, and they usually require flexible interaction of voice and digital data.

Also, tester 100 may place a plurality of outbound calls to telecommunication system 102, and then obtain a call history log from local user switch 106. By analyzing data contained in the call history log, tester 100 can determine whether local user switch 106 processed the plurality of outbound calls correctly, thereby determining whether local user switch 106 is defective.

Also, because tester 100 preferably includes at least ninety-six (96) ports, tester 100 may place another plurality of outbound calls to telecommunication system 102, thereby simulating a maximum load condition. Further, tester 100 may then perform either regression or feature testing during the maximum load condition.

Also, tester 100 may place an outbound call to telecommunication system 102, thereby causing file server 114 to produce digital data related to the outbound call. In particular, telecommunication system 102 might display the data using personal computer 116 for subsequent review by another human operator. The displayed data is commonly known as a "screen pop." Because tester 100 can monitor the data displayed on personal computer 116, it can compare the displayed data with characteristics of the outbound call, thereby determining whether either local user switch 106, file server 114, or personal computer 116 is defective.

Having described one embodiment, numerous alternative embodiments or variations might be made. For example, it was described that the telecommunication system tester includes serial and voice ports, and that the telecommunication system tester is connected to a switched telephone network. However, this was merely an illustration. The telecommunication system tester according to the present invention might be connected to a packet-switched network such as the integrated services digital network (ISDN). Further, the telecommunication system tester might also include transmission control protocol/Internet protocol (TCP/IP) ports.

Also, it was described that the telecommunication system tester transmits and receives voice and digital data over the switched telephone network. However, this was also merely an illustration. The telecommunication system tester might transmit and receive voice and digital data by direct connection to the telecommunication system.

Also, it was described that the telecommunication system tester includes serial ports for transmitting or receiving digital data over data lines, and voice ports for transmitting or receiving voice data over voice lines. However, the telecommunication system tester might also include circuitry for transmitting or receiving both voice and digital data carried simultaneously by a single line.

For example, using asymmetric digital subscriber line (ADSL) technology, a single line can carry voice data in a lower part of the spectrum and digital data in an upper part of the spectrum. Accordingly, the telecommunication system tester might include filters for separating the voice data from the digital data for subsequent processing.

Further, using ISDN technology, a single line can carry voice data in digital form along with other digital data. Accordingly, the telecommunication system tester might include circuitry for digitizing, compressing, and "packetizing" the voice data for subsequent transmission. Further, the telecommunication system tester might include circuitry for decoding and reassembling the voice data for subsequent analysis.

Also, it was described that the telecommunication system tester can process both voice and digital data while accessing a database. However, this was also merely an illustration. The telecommunication system tester might process voice data, digital data, and video data simultaneously while accessing the database for verifying telecommunication systems running multimedia telephony applications.

Therefore, the invention should be limited only by the spirit and scope of the appended claims.

What is claimed is:

1. A method of testing a telecommunication system, the telecommunication system being connectable to a telecommunication network, comprising the steps of:
    (a) generating test data including voice data and digital data;
    (b) transmitting the test data to the telecommunication system;
    (c) simultaneously detecting voice data and digital data produced by the telecommunication system in response to the test data transmitted in step (b), wherein the voice data and the digital data are detected on respective lines; and
    (d) evaluating the voice data and the digital data detected in step (c) using stored expected data, thereby determining whether the telecommunication system is operating properly.

2. A tester for a telecommunication system, the telecommunication system being connectable to a telecommunication network, comprising:
    (a) at least one processor for controlling generation of test data and evaluation of response data, wherein the test data includes voice data and digital data, and wherein the response data includes voice data and digital data produced by the telecommunication system in response to the test data;
    (b) means for transmitting the test data to the telecommunication system, the transmitting means being connected to the at least one processor;
    (c) means for detecting the response data, the detecting means being connected to the at least one processor, wherein the voice data and the digital data are detected by the detecting means on respective lines; and
    (d) at least one storage device coupled to the at least one processor, the transmitting means, and the detecting means, for storing expected data used to evaluate the response data.

3. A method of testing a telecommunication system, the telecommunication system including a plurality of subsystems and being connectable to a telecommunication network, comprising the steps of:
    (a) transmitting digital data to the telecommunication system for determining a current status of the telecommunication system;
    (b) receiving digital data from the telecommunication system, the received digital data being produced by the telecommunication system in response to the digital data transmitted in step (a);
    (c) generating test data using the digital data received in step (b);
    (d) transmitting the test data to the telecommunication system;
    (e) receiving response data from the telecommunication system, the received response data being produced by the telecommunication system in response to the test data transmitted in step (d); and
    (f) comparing the response data received in step (e) with expected response data, thereby determining whether the telecommunication system is operating properly.

4. The method of testing a telecommunication system as recited in claim 3,
    wherein the plurality of subsystems is selected from the group consisting of a local user switch, a digital telephone, a file server, a personal computer, a voice response unit, and an analog telephone.

5. The method of testing a telecommunication system as recited in claim 3,
    wherein the current status of the telecommunication system includes indications of which subsystems are present and which subsystems are responsive.

6. The method of testing a telecommunication system as recited in claim 3,
    wherein the current status of the telecommunication system includes a current load status.

7. The method of testing a telecommunication system as recited in claim 3,
    wherein the test data generated in step (c) includes voice data and digital data.

8. The method of testing a telecommunication system as recited in claim 7,
    wherein the response data received in step (e) includes voice data and digital data.

9. The method of testing a telecommunication system as recited in claim 8,
    wherein the response data is received in step (e) while the test data is being transmitted in step (d).

10. The method of testing a telecommunication system as recited in claim 3,
    wherein the expected response data is stored in a database.

11. The method of testing a telecommunication system as recited in claim 10,
    wherein the transmitting in step (d), the receiving in step (e), and the comparing in step (f) are executed in parallel.

12. A method of testing a telecommunication system using a telephony interface and a data communications interface, the telecommunication system being connectable to a telecommunication network, comprising the steps of:

(a) transmitting voice data to the telecommunication system using a first port, the first port being included in the telephony interface;

(b) receiving digital data from the telecommunication system using a second port, the second port being included in the data communications interface, the received digital data being produced by the telecommunication system in response to the voice data transmitted in step (a); and (c) comparing the digital data received in step (b) with expected digital data, thereby determining whether the telecommunication system is operating properly.

13. The method of testing a telecommunication system as recited in claim 12, wherein the expected digital data includes data related to the voice data transmitted in step (a).

14. A tester for a telecommunication system, the telecommunication system being connectable to a telecommunication network, comprising:

(a) means for transmitting and receiving voice data;

(b) means for transmitting and receiving digital data; and (c) a test computer including a plurality of processors, connected to both the means for transmitting and receiving voice data, and the means for transmitting and receiving digital data, wherein at least one processor controls the means for transmitting and receiving voice data, wherein at least one different processor controls the means for transmitting and receiving digital data, and wherein the at least one processor and the at least one different processor operate in parallel.

15. The tester for a telecommunication system as recited in claim 14, further comprising (d) a database coupled to the test computer, wherein at least one additional processor controls both the reading of data from the database, and the writing of data to the database, and wherein the at least one processor, the at least one different processor, and the at least one additional processor operate in parallel.

\* \* \* \* \*